US008888528B2

(12) United States Patent
Van Swearingen et al.

(10) Patent No.: US 8,888,528 B2
(45) Date of Patent: Nov. 18, 2014

(54) DUAL CONNECTOR INTERFACE FOR CAPACITIVE OR CONDUCTIVE COUPLING

(71) Applicant: Andrew LLC, HIckory, NC (US)

(72) Inventors: Kendrick Van Swearingen, Woodridge, IL (US); Ronald A. Vaccaro, Shorewood, IL (US); Jeffrey David Paynter, Momence, IL (US); Michael R. Guerin, St. Charles, IL (US)

(73) Assignee: Andrew LLC, Hickory, NC (US)

( * ) Notice: Subject to any disclaimer, the term of this patent is extended or adjusted under 35 U.S.C. 154(b) by 128 days.

(21) Appl. No.: 13/850,989

(22) Filed: Mar. 26, 2013

(65) Prior Publication Data

US 2014/0134863 A1 May 15, 2014

Related U.S. Application Data

(63) Continuation-in-part of application No. 13/673,084, filed on Nov. 9, 2012, now Pat. No. 8,622,768.

(51) Int. Cl.
*H01R 9/05* (2006.01)
*H01G 2/10* (2006.01)
*H01Q 1/00* (2006.01)
*H01F 10/00* (2006.01)
*H01P 5/02* (2006.01)

(52) U.S. Cl.
CPC .. *H01R 9/05* (2013.01); *H01G 2/10* (2013.01); *H01Q 1/00* (2013.01); *H01F 10/00* (2013.01); *H01P 5/026* (2013.01)
USPC .......................................... 439/578; 439/315

(58) Field of Classification Search
CPC .. H01R 2103/00; H01R 24/40; H01R 13/641; H01R 13/625
USPC .................. 439/578, 312, 313, 315, 316, 317
See application file for complete search history.

(56) References Cited

U.S. PATENT DOCUMENTS

| | | |
|---|---|---|
| 4,397,515 A | 8/1983 | Russell |
| 4,943,245 A | 7/1990 | Lincoln |
| 5,796,315 A | 8/1998 | Gordon et al. |
| 5,977,841 A | 11/1999 | Lee et al. |
| 6,414,636 B1 | 7/2002 | Godard et al. |
| 6,496,353 B1 | 12/2002 | Chio |
| 6,683,254 B1 | 1/2004 | Gunnels |
| 6,798,310 B2 | 9/2004 | Wong et al. |
| 6,853,337 B2 | 2/2005 | Barabash |
| 6,926,555 B2 | 8/2005 | Nelson |
| 7,625,226 B1 | 12/2009 | Gastineau |
| 8,157,598 B2 | 4/2012 | Niitsu |
| 8,174,132 B2 | 5/2012 | Van Swearingen |

(Continued)

OTHER PUBLICATIONS

Gon Sung Kim, International Search Report for PCT/US13/59392, Dec. 23, 2013, Daejeon Metropolitan City, Republic of Korea.

*Primary Examiner* — Hae Moon Hyeon
(74) *Attorney, Agent, or Firm* — Babcock IP, PLLC

(57) ABSTRACT

A connection interface with a female portion for interconnection with a conductive male portion or a capacitive coupling male portion interface provides conductive coupling when interconnected with the conductive male portion and capacitive coupling when coupled with the capacitive coupling male portion. The female portion may include a spring basket dimensioned to receive a pin of the conductive male portion and to seat within a socket of the conductive male portion, separated by an inner conductor dielectric spacer.

20 Claims, 4 Drawing Sheets

(56) References Cited

U.S. PATENT DOCUMENTS

| | | | |
|---|---|---|---|
| 8,622,762 B2 * | 1/2014 | Van Swearingen et al. | .. 439/248 |
| 8,622,768 B2 * | 1/2014 | Van Swearingen et al. | .. 439/578 |
| 8,747,152 B2 * | 6/2014 | Van Swearingen et al. | .. 439/578 |
| 8,801,460 B2 * | 8/2014 | Van Swearingen et al. | .. 439/578 |
| 2003/0137372 A1 | 7/2003 | Fehrenbach et al. | |
| 2010/0124839 A1 | 5/2010 | Montena | |

* cited by examiner

DUAL CONNECTOR INTERFACE FOR CAPACITIVE OR CONDUCTIVE COUPLING

BACKGROUND

1. Field of the Invention

This invention relates to electrical cable connectors. More particularly, the invention relates to coaxial connectors with an interconnection interface alternatively connectable with conductive or capacitive coupling between signal conducting portions of the connection interface.

2. Description of Related Art

Coaxial cables are commonly utilized in RF communications systems. Coaxial cable connectors may be applied to terminate coaxial cables, for example, in communication systems requiring a high level of precision and reliability.

Connector interfaces provide a connect and disconnect functionality between a cable terminated with a connector bearing the desired connector interface and a corresponding connector with a mating connector interface mounted on an apparatus or a further cable. Prior coaxial connector interfaces typically utilize a retainer provided as a threaded coupling nut which draws the connector interface pair into secure conductive electro-mechanical engagement as the coupling nut, rotatably retained upon one connector, is threaded upon the other connector.

Passive Intermodulation Distortion (PIM) is a form of electrical interference/signal transmission degradation that may occur with less than symmetrical interconnections and/or as electro-mechanical interconnections shift or degrade over time, for example due to mechanical stress, vibration, thermal cycling, and/or material degradation. PIM is an important interconnection quality characteristic as PIM generated by a single low quality interconnection may degrade the electrical performance of an entire RF system.

Recent developments in RF coaxial connector design have focused upon reducing PIM by improving interconnections between the conductors of coaxial cables and the connector body and/or inner contact, for example by applying a molecular bond instead of an electro-mechanical interconnection, as disclosed in commonly owned US Patent Application Publication 2012/0129391, titled "Connector and Coaxial Cable with Molecular Bond Interconnection", by Kendrick Van Swearingen and James P. Fleming, published on 24 May 2012 and hereby incorporated by reference in its entirety.

Competition in the cable connector market has focused attention on improving interconnection performance and long term reliability of the interconnection. Further, reduction of overall costs, including materials, training and installation costs, is a significant factor for commercial success.

Therefore, it is an object of the invention to provide a coaxial connector and method of interconnection that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Figure 1:
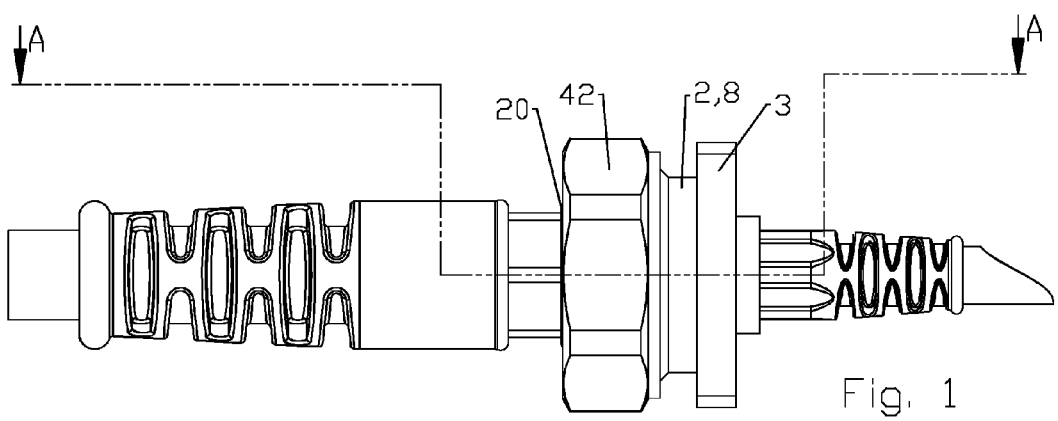
FIG. 1 is a schematic side view of an exemplary embodiment of a female portion interconnected with a conductive male portion.

PIM reduction has also been addressed with respect to the contacting portions of a connector interface by applying capacitive coupling between these surfaces, as disclosed in commonly owned US Patent Application Publication 2013/0065420, titled "Connector with Capacitively Coupled Connector Interface", by Kendrick Van Swearingen, James P. Fleming, Jeffrey D. Paynter and Ronald A. Vaccaro, published on 14 Mar. 2013 and hereby incorporated by reference in its entirety. The inventor has recognized that the cable connector market has a significant investment in connectors, cables and equipment configured for standardized electro-mechanically coupled interfaces, for example the 7/16 DIN coaxial connector interface, which may hinder adoption of the PIM reduction improvements available via capacitively coupled connector interfaces.

Exemplary embodiments of a coaxial connector with a connection interface suitable for interconnection with either a standardized conductive electro-mechanical interface connector or a capacitively coupled connector interface connector are demonstrated in FIGS. 1-6.

The female portion 2 of the coaxial connector pair may be adapted to conform to a conventional connection interface, here demonstrated as a panel mountable 7/16 DIN standard coaxial interface with a planar base 3, wherein a female inner contact 4 provided as a spring basket 6 is supported coaxially within a female connector body 8 with a cylindrical outer conductor contact surface 10, the outer diameter of which provides the inner sidewall 12 of an annular outer conductor groove 14 open to an interface end 16 of the female connection interface 18 (a bore of the female connector body 8).

Figure 2:
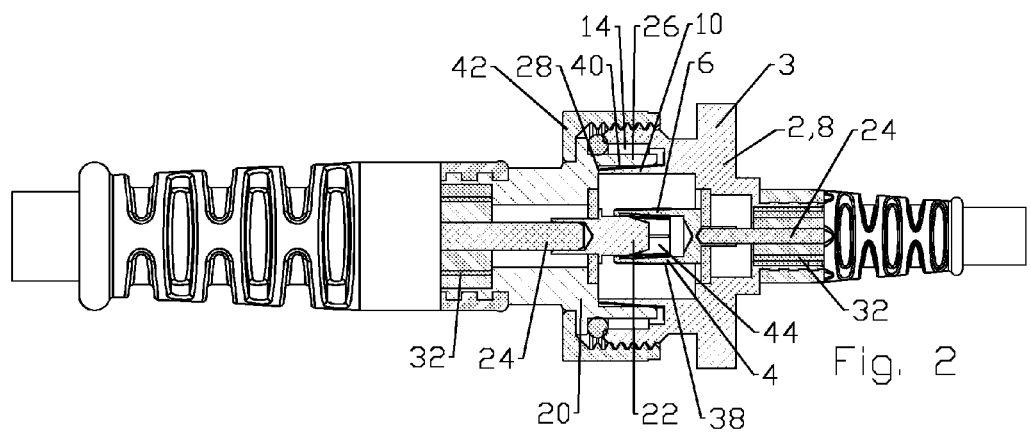
FIG. 2 is a schematic partial cut-away view of the interconnection of FIG. 1, taken along line A-A.

Upon interconnection with a conventional conductive male portion 20, such as a standard male 7/16 DIN connector, for example as shown in FIGS. 1 and 2, an inner contact 21 provided as a pin 22 of the conductive male portion 20 seats within the spring basket 6, forming a conductive electro-mechanical interconnection along the inner conductor 24, and an outer conductor protrusion 26 seats within the outer conductor groove 14, a distal end of the outer conductor contact surface 10 bottoming against an inner diameter shoulder 28 of the conductive male connector portion 34, providing a secure electro-mechanical interconnection along the outer conductor 32 and limiting the axial advance of the conductive male and female portions 20, 2 toward one another during interconnection.

Figure 3:
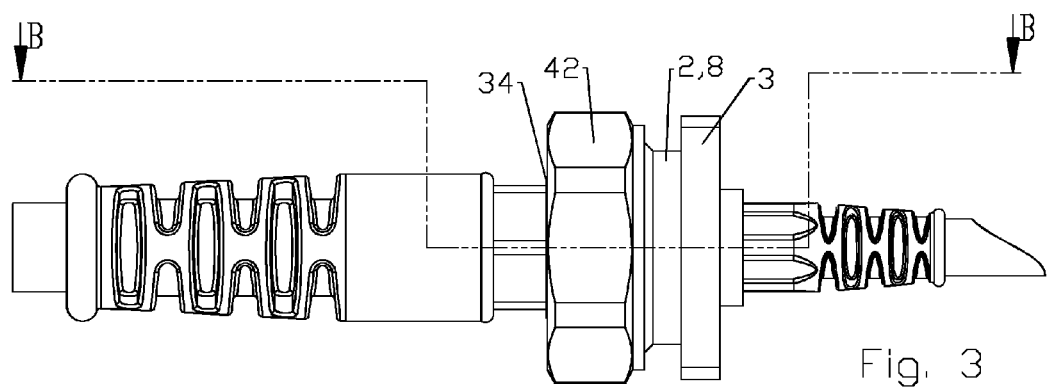
FIG. 3 is a schematic side view of an exemplary embodiment of a female portion interconnected with a capacitive coupling male portion.
Figure 4:
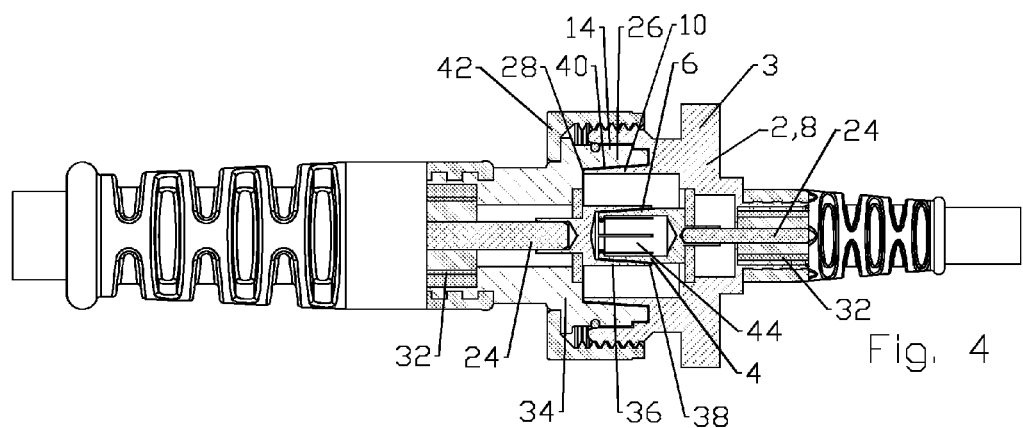
FIG. 4 is a schematic partial cut-away view of the interconnection of FIG. 3, taken along line B-B.

The same female portion 2 may be alternatively interconnected with a capacitive coupling male portion 34, for example as shown in FIGS. 3 and 4. The inner contact 21 of the capacitive coupling male portion 34 is provided with a socket 36 dimensioned to seat upon an outer diameter of the spring basket 6, separated from direct contact with the spring basket 6 by an inner contact dielectric spacer 38. Similarly, the outer conductor protrusion 26 is dimensioned to seat against the bottom of the outer conductor groove 14, separated from direct contact with the female portion 2 by an outer conductor dielectric spacer 40, limiting the axial advance of the capacitive coupling male and female portions 34, 2 toward one another during interconnection. The socket 36 may be dimensioned to slightly compress a distal end of the spring fingers 44 of the spring basket 6 conforming them to the conical dimensions of the socket 36 to absorb any dimensional variation the spring fingers 44 may have assumed from prior interconnections, for example from being slightly spread by an inner pin 22 during a prior conductive type interconnection. Thereby, the spring fingers 44 will have a bias against the socket 36 for repeatable fit with respect to capacitive coupling.

The coupling nut 42 of the capacitive coupling male portion 34 has been demonstrated formed from a dielectric material, for example a fiber-reinforced polymer. Therefore, when engaged to interlock the capacitive coupling male portion 34 and the female portion 2 in an interconnected position, the coupling nut 42 does not create a conductive electro-mechanical coupling between the capacitive coupling male portion 34 and the female portion 2. Where the additional wear and/or strength characteristics of a metal material coupling nut 42 are desired, a coupling nut dielectric spacer may be applied, for example between seating surfaces of the coupling nut 42 and the capacitive coupling male portion 34, to electrically isolate the coupling nut 42 from the capacitive coupling male portion 34.

One skilled in the art will appreciate that a capacitive coupling interconnection may be optimized for a specific operating frequency band. For example, the level of capacitive coupling between separated conductor surfaces is a function of the desired frequency band(s) of the electrical signal(s), the surface area of the separated conductor surfaces, the dielectric constant of a dielectric spacer and the thickness of the dielectric spacer (distance between the separated conductor surfaces).

The dielectric coatings of the outer and inner conductor dielectric spacers 40, 38 may be provided, for example, as a ceramic or polymer dielectric material. One example of a dielectric coating with suitable compression and thermal resistance characteristics that may be applied with high precision at very thin thicknesses is ceramic coatings. Ceramic coatings may be applied directly to the desired surfaces via a range of deposition processes, such as Physical Vapor Deposition (PVD) or the like. Ceramic coatings have a further benefit of a high hardness characteristic, thereby protecting the coated surfaces from damage prior to interconnection and/or resisting thickness variation due to compressive forces present upon interconnection. The ability to apply extremely thin dielectric coatings, for example as thin as 0.5 microns, may reduce the surface area requirement of the separated conductor surfaces, enabling the overall dimensions of the connection interface to be reduced.

One skilled in the art will appreciate that the inner and outer conductor dielectric spacers 38, 40 may be applied alternatively to the female portion 2 and/or the capacitive coupling male portion 34.

Figure 5:
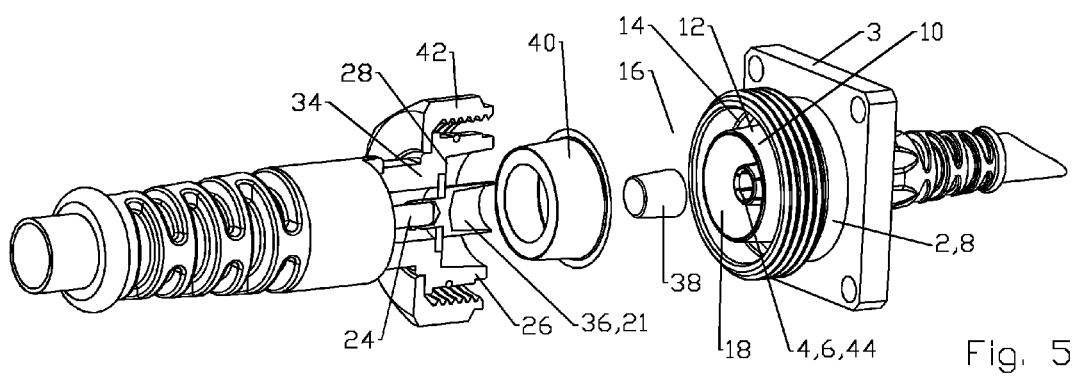
FIG. 5 is a schematic partial cut-away exploded isometric view of a capacitive coupling male portion and a female portion, demonstrating inner and outer contact dielectric spacers.

For example, as shown in FIG. 5, the inner conductor dielectric spacer 38 may be applied as a dielectric coating upon an inner diameter of the socket 36 of the capacitive coupling male portion 34 and the outer conductor dielectric spacer 40 may be applied as a dielectric coating upon the shoulder 28 which extends along the inner diameter and over a distal end of the outer conductor protrusion 26. Because the dielectric spacers may be provided entirely upon the capacitive coupling male portion 34, these dielectric spacers do not interfere with conductive coupling of a conventional conductive male portion 20 with the female portion 2.

Figure 6:
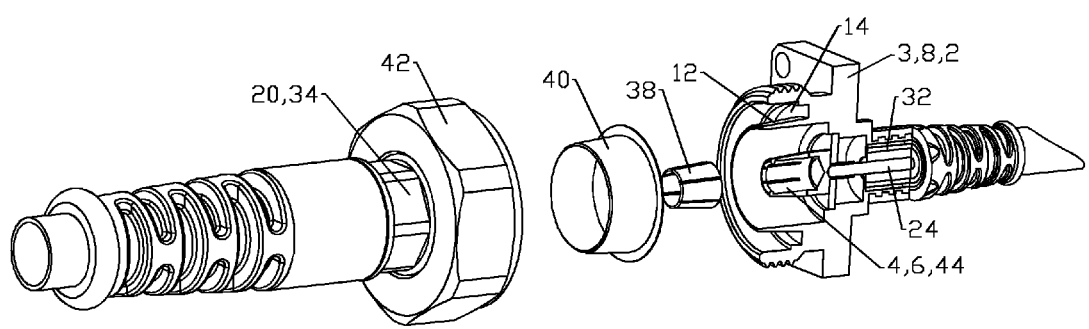
FIG. 6 is a schematic partial cut-away exploded isometric view of a male portion and a female portion, demonstrating alternative inner and outer contact dielectric spacers.

For example, as shown in FIG. 6, the inner conductor dielectric spacer 38 may be applied as a dielectric coating upon an outer diameter of each spring finger 44 of the spring basket 6 and the outer conductor dielectric spacer 40 may be applied as a dielectric coating upon the outer diameter of the outer conductor contact surface 10 and bottom of the outer conductor groove 14. Conventional conductive interconnection with a standard conductive male portion 20 is not interfered with, because the distal end of the outer conductor contact surface 10 and internal contact surfaces of the spring basket 6 are not covered by the respective inner and/or outer conductor dielectric spacers 38, 40.

Further, the inner and outer conductor dielectric spacers 38 and 40 may each be applied as described to one each of the female portion 2 and the capacitive coupling male portion 34 or both on each, with the cumulative thickness of the surfaces providing additional assurance that the thin coatings have remained in place and/or each providing additional assurance of uniformity of coverage should one or both have been damaged or mis-applied.

The embodiments herein utilize male and female descriptors for ease of reference with respect to the figures and ready reference to standardized connector interface nomenclatures, only. One skilled in the art will appreciate that these designations may be swapped one for the other as known equivalents of each other by exchange of various features of the connector bodies or the like and notably in view of the capacitive coupling male portion 34 including a socket 36, commonly understood as a "female" geometry as a result of the gender exchange characteristic that arises by utilizing both inner and outer diameter surfaces of the spring basket 6. Therefore, a "male" portion may be the primary portion to which alternative capacitive and conductive "female" portions couple, as a further equivalent.

One skilled in the art will appreciate that the dual capacitive coupling and conductive coupling interconnection capability of the connection interface enables users to apply, for example, the female portion 2 to equipment that may benefit from future adoption of capacitive coupling as a new interconnection standard, without requiring abandonment of existing conductive coupling equipment and/or practices. Thereby, a significant increase of utility and/or versatility may be obtained at minimal additional expense and/or immediate technology adoption commitment.

| Table of Parts | |
|---|---|
| 2 | female portion |
| 3 | base |
| 4 | female inner contact |
| 6 | spring basket |
| 8 | female connector body |
| 10 | outer conductor contact surface |
| 12 | inner sidewall |
| 14 | outer conductor groove |
| 16 | interface end |
| 18 | female connection interface |
|  | (a bore of the female connector body 8) |
| 20 | conductive male portion |
| 21 | male inner contact |
| 22 | inner pin |

-continued

| Table of Parts | |
|---|---|
| 24 | inner conductor |
| 26 | outer conductor protrusion |
| 28 | shoulder |
| 32 | outer conductor |
| 34 | capacitive coupling male portion |
| 36 | socket |
| 38 | inner contact dielectric spacer |
| 40 | outer conductor dielectric spacer |
| 42 | coupling nut |
| 44 | spring finger |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A connection interface with a female portion for interconnection with a conductive male portion or a capacitive coupling male portion, comprising:
the female portion provided with a female connector body supporting a female inner contact coaxially within a bore of the female connector body;
an inner contact dielectric spacer electrically isolating the female inner contact from a male inner contact of the capacitive coupling male portion when the capacitive coupling male portion is interconnected with the female portion; and a male inner contact of the conductive male portion electro-mechanically coupling with the female inner contact when the conductive male portion is interconnected with the female portion;
an outer conductor dielectric spacer electrically isolating the female connector body from the capacitive coupling male portion when the capacitive coupling male portion is interconnected with the female portion; and the conductive male portion electro-mechanically coupling with the female connector body when the conductive male portion is interconnected with the female portion.

2. The connection interface of claim 1, wherein the female inner contact has a spring basket;
the male inner contact of the capacitive coupling male portion has a socket dimensioned to seat upon an outer diameter of the spring basket; and
the male inner contact of the conductive male portion has a pin dimensioned to seat within an inner diameter of the spring basket.

3. The connection interface of claim 2, wherein the inner contact dielectric spacer is coupled to the socket.

4. The connection interface of claim 2, wherein the inner contact dielectric spacer is coupled to an outer diameter of the spring basket.

5. The connection interface of claim 2, wherein the socket is dimensioned to compress a distal end of spring fingers of the spring basket radially inward.

6. The connection interface of claim 1, wherein the female portion is provided with a cylindrical outer conductor contact surface; an outer diameter of the outer conductor contact surface is an inner sidewall of an annular outer conductor groove open to an interface end; the conductive male portion and the capacitive coupling male portion provided with a shoulder and an outer conductor protrusion dimensioned to seat within the outer conductor groove upon interconnection; the outer conductor contact surface directly contacting the shoulder of the conductive male connector body and the outer conductor protrusion of the capacitive coupling male portion bottoming against the outer conductor dielectric spacer at a bottom of the outer conductor groove.

7. The connection interface of claim 6, wherein the outer contact dielectric spacer is coupled to the capacitive coupling male portion, covering the shoulder and extending along an inner diameter and over a distal end of the outer conductor protrusion.

8. The connection interface of claim 6, wherein the outer contact dielectric spacer is coupled to the female portion, covering an outer diameter of the outer conductor contact surface and the bottom of the outer conductor groove.

9. The connection interface of claim 1, wherein the inner conductor dielectric spacer and the outer conductor dielectric spacer are ceramic coatings.

10. The connection interface of claim 1, wherein the capacitive coupling male portion further includes a coupling nut dimensioned to interlock with the female portion, the coupling nut provided as a portion of dielectric material.

11. The connection interface of claim 1, wherein the female connector body is dimensioned is a panel mountable connector with a generally planar base.

12. A connection interface with a female portion for interconnection with a conductive male portion or a capacitive coupling male portion, comprising:
a spring basket of the female portion;
a socket of the capacitive coupling male portion;
a pin of the conductive male portion; and
an inner conductor dielectric spacer;
the socket dimensioned to seat against an outer diameter of the spring basket, electrically isolated from the spring basket by the inner conductor dielectric spacer;
the pin dimensioned to couple with an inner diameter of the spring basket.

13. The connection interface of claim 12, wherein the inner contact dielectric spacer is coupled to the socket.

14. The connection interface of claim 12, wherein the inner contact dielectric spacer is coupled to an outer diameter of the spring basket.

15. The connection interface of claim 13, wherein the inner conductor dielectric spacer is a coating of ceramic material.

16. The connection interface of claim 14, wherein the inner conductor dielectric spacer is a coating of ceramic material.

17. The connection interface of claim 12, wherein the socket is dimensioned to compress a distal end of spring fingers of the spring basket radially inward.

18. The connection interface of claim 12, wherein the spring basket is an interface end of an inner contact supported coaxially within the female portion.

19. The connection interface of claim 12, wherein the female portion provided with a cylindrical outer conductor contact surface; and an outer diameter of the outer conductor contact surface is an inner sidewall of an annular outer conductor groove open to an interface end.

20. The connection interface of claim 19, wherein an outer contact dielectric spacer is coupled to the female portion, covering an outer diameter of the outer conductor contact surface and the bottom of the outer conductor groove.

* * * * *